M. BARNETT & L. BURGESS.
ART OF TREATING ALUNOGEN, HALOTRICHITE, OR THE LIKE.
APPLICATION FILED JULY 13, 1917.
1,280,636.
Patented Oct. 8, 1918.
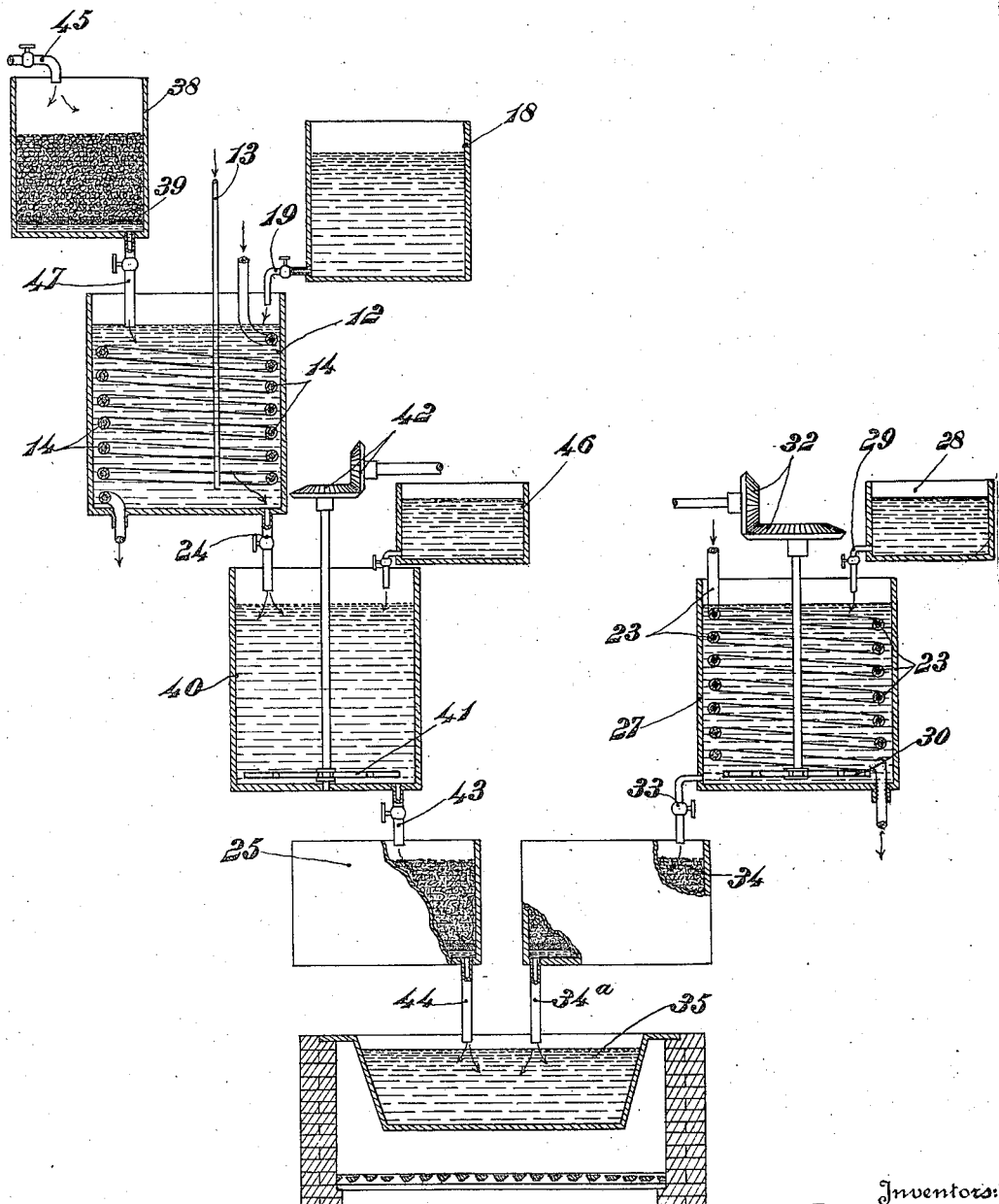

UNITED STATES PATENT OFFICE.

MAURICE BARNETT AND LOUIS BURGESS, OF NEW YORK, N. Y.

ART OF TREATING ALUNOGEN, HALOTRICHITE, OR THE LIKE.

1,280,636.    Specification of Letters Patent.    Patented Oct. 8, 1918.

Application filed July 13, 1917. Serial No. 180,384.

*To all whom it may concern:*

Be it known that we, MAURICE BARNETT and LOUIS BURGESS, citizens of the United States, residing at New York, in the county of New York and State of New York, have invented or discovered certain new and useful Improvements in the Art of Treating Alunogen, Halotrichite, or the like, of which the following is a specification, reference being had therein to the accompanying drawing.

This invention relates to the art of treating certain deposits containing aluminum sulfate found in the west, principally in Grant county, New Mexico, and known variously as "alunogen," "halotrichite," "natural alum," etc., for the purpose of recovering alumina, ferric oxid and sulfuric acid. Although these deposits are of large extent and well-known they have never been worked commercially.

The alunogen and halotrichitic deposits referred to have a variable composition, as is clear from the following analyses of rock and incrustations from Alum Mountain, New Mexico:

| | | | |
|---|---|---|---|
| Alumina | 16.87 | 16.75 | 10.08 |
| Ferric oxid | 4.25 | 2.88 | 2.30 |
| Ferrous oxid | 1.50 | 1.70 | .18 |
| Lime | .33 | .15 | |
| Magnesia | .16 | .23 | |
| Silicic acid | 56.11 | 31.31 | 30.07 |
| Sulfuric acid ($SO_3$) | 14.08 | 26.36 | 26.38 |
| Water | 6.26 | 20.93 | 32.29 |
| | 99.56 | 100.31 | 101.30 |

By lixiviating such material with water the soluble constituents are extracted and a solution is produced containing aluminum sulfate more or less contaminated with iron sulfate.

We have discovered that by treating such solutions of aluminum sulfate and sulfate of iron in concentrated form with a concentrated solution of ammonium sulfate a double sulfate of aluminum and ammonium will crystallize out, the iron sulfate remaining in the mother liquor. If this double sulfate (ammonium-alum) be removed from the mother liquor and dissolved in water and treated with ammonia the aluminum can be precipitated as hydroxid and recovered, ammonium sulfate remaining in the solution. If the aforesaid mother liquor, containing sulfate of iron, be treated with ammonia the iron can be precipitated as hydroxid and recovered, ammonium sulfate remaining in the solution.

In practising our process the soluble constituents of the alunogen or halotrichite, *i. e.*, the aluminum sulfate and iron sulfate, are first brought into solution. The solution is concentrated and is then treated with a strong solution of ammonium sulfate, whereupon the aluminum sulfate and the ammonium sulfate will crystallize out as ammonium-alum, leaving the iron sulfate in solution. The crystals of ammonium-alum, after being removed from the crystallizing tank, may be dissolved in water and treated with ammonia for the production of aluminum hydroxid and ammonium sulfate. Care should be exercised not to add an excess of ammonia as that would tend to re-dissolve the precipitated aluminum hydroxid. The solution is then heated to drive off any excess of ammonia, being preferably stirred while the heating is in progress. When the free ammonia has been driven off the heat may be discontinued and the aluminum hydroxid may be removed from the solution of ammonium sulfate by filtration and may then be dried and calcined. The mother liquor containing sulfate of iron may be treated with ammonia whereby the iron will be precipitated as iron hydroxid which can be separated from the solution of ammonium sulfate by filtration and dried and calcined. The solutions of ammonium sulfate may be concentrated and used in part in repetitions of the process or disposed of for industrial purposes.

In practising our invention we have found that the separation of the ammonium-alum appears to take place more readily if the iron present in the solution is in the ferric form. The solution of sulfates may, therefore, prior to treatment, be exposed with advantage to some oxidizing agency for the purpose of oxidizing ferrous iron present. This oxidizing of the iron may be effected by forcing ozone or ozonated air into a tank containing the solution. Or the solution may be sprayed into a receptacle through which ozone or ozonated air is forced.

The accompanying drawing is a somewhat diagrammatic illustration of an apparatus or equipment that may be used in the process of producing alumina from alunogen or halotrichitic deposits. Furnaces for drying and calcining the aluminum hydroxid and the iron hydroxid, being of well known construction, are not represented.

Referring to the drawing, 12 denotes a tank adapted to contain the solution to be treated and 13 is a pipe through which ozone or ozonated air, prepared in any well-known manner, as by the electrical process employed in ozone water purifiers, may be forced into said tank. The solution in the tank 12 will preferably be heated by a steam coil 14, whereby concentration of the solution may be effected by evaporation. The ammonium sulfate solution used in the production of the ammonium-alum may be contained in a tank 18 from which it can pass through a pipe 19 into tank 12. Under the action of the ammounium sulfate ammonium-alum crystals will form in tank 12, the iron sulfate remaining in the mother liquor. For the convenient removal of the ammonium alum crystals lead strips may be suspended in the solution. The bulk of the ammonium alum crystals will be deposited on these strips.

The ammonium-alum crystals, after being removed from the mother liquor in tank 12, may be re-dissolved in water in a tank 27, which is preferably provided with a stirrer 30 driven by gearing 32 connected with a suitable source of power. If the precipitant to be used to precipitate the alumina from the solution of ammonium-alum consists of aqueous ammonia this may be contained in a tank 28 from which it can pass through a pipe 29 into tank 27. The tank 27 may be heated by a steam coil 23 by which any excess of ammonia added to the solution in tank 27 may be driven off by heat. Under the action of the heat, the addition of the precipitant and the mechanical agitation of the solution in tank 27 the aluminum is precipitated as hydroxid and may be separated from the mother liquid by filtration. To this end the tank 27 is connected by a pipe 33 with a filter box or tank 34 which will collect the preciptated aluminum hydroxid and permit the solution of ammonium sulfate to pass as filtrate from the filter box or tank 34 through a pipe 34ª to an evaporating tank 35 where it may be concentrated and a part thereof used over again; or it may be run into crystallizing tanks for the recovery of the ammonium sulfate. The evaporating tank or pan 35 may be arranged over a furnace combustion chamber, as shown, to be heated.

The mother liquor in tank 12, which contains the iron sulfate, may be run through a pipe 24 into another tank 40 and treated with ammonia supplied from a tank 46, whereby iron hydroxid and ammonium sulfate will be formed. Said tank 40 will be preferably provided with a stirrer 41 driven by gearing 42 connected with a suitable source of power. The iron hydroxid may be separated from the mother liquor by filtration. To this end tank 40 is connected by a pipe 43 with a filter box or tank 25 which will collect the precipitated iron hydroxid and permit the filtrate, consisting of a solution of ammonium sulfate, to pass, through the pipe 44, from the filter box or tank 25 to the evaporating tank 35; and when said ammonium sulfate has been concentrated in said tank 35 it may be used over again in the process, or it may be otherwise disposed of. The aluminum hydroxid or the iron hydroxid, or both, may be taken from the filter tanks 34 and 25 respectively, and dried and calcined in suitable furnaces.

Where ammonia is mentioned herein either gaseous ammonia or aqueous ammonia may be understood. The terms "strong solution" and "concentrated solution" are used synonymously herein. The separation of the double sulfate of aluminum and ammonium will be effected more readily and completely in strong solutions than in weak solutions.

Preliminary to the treatment of the solution in tank 12 it is necessary that the soluble constituents of the alunogen, halotrichite, etc., should be brought into solution. To this end the alunogen, halotrichite, etc., will be crushed to a suitable size, placed in a leaching tank 38 provided with a false perforated bottom 39 on which is spread a filter cloth. Water is then admitted to said tank 38 through a pipe 45. The leachings from said tank, containing aluminum sulfate and iron sulfate, may then be discharged from beneath said false bottom through a pipe or spout 47 into tank 12.

While the object of this invention is the production of alumina from the deposits containing aluminum sulfate found in the west, it is obvious that the process can be used for the production of alumina from solutions of aluminum sulfate from whatever source obtained. Furthermore, while a description has been given of apparatus that may be used in carrying out this invention, it is obvious that any suitable apparatus may be used for the same purpose.

It will be clear from the foregoing that the process herein described will permit the utilization of sources of alumina not heretofore considered available for the purpose and will reduce the cost of producing alumina in comparison with existing methods.

The method heretofore suggested for producing alumina from the impure alunogen and halotrichite deposits of the west consisted in making a pure solution of aluminum sulfate and then driving off the water of crystallization and the sulfuric acid by the application of heat. By such a method a part of the iron and a part of the sulfuric acid are lost. But by the process herein set forth the iron and the sulfuric acid of the alunogen and halotrichite are recovered, constituting valuable by-products of the process, the sale of which tends to reduce the cost of producing the alumina. Furthermore, the alumina produced is of a high grade, free from sodium and objectionable elements and is adapted for use in the production of metallic aluminum.

Having thus described our invention we claim and desire to secure by Letters Patent:

1. The herein described process for the treatment of alunogen, halotrichite and natural alum, consisting in producing a solution of the soluble constituents thereof, treating said solution with a solution of ammonium sulfate thereby producing a double sulfate of aluminum and ammonium (ammonium alum), removing the ammonium alum, dissolving the ammonium alum in water and treating the solution with ammonia, thus producing aluminum hydroxid and ammonium sulfate, removing and drying the aluminum hydroxid and recovering the ammonium sulfate.

2. The herein described process for the treatment of alunogen, halotrichite and natural alum, consisting in producing a solution of the soluble constituents thereof, treating said solution with a solution of ammonium sulfate thereby producing a double sulfate of aluminum and ammonium (ammonium alum), removing the ammonium alum, dissolving the ammonium alum in water and treating the solution with ammonia, thus producing aluminum hydroxid and ammonium sulfate, removing, drying and calcining the aluminum hydroxid and recovering the ammonium sulfate.

3. The herein described process for the treatment of alunogen, halotrichite and natural alum, consisting in producing a solution of the soluble constituents thereof, treating said solution with a solution of ammonium sulfate thereby producing a double sulfate of aluminum and ammonium (ammonium alum), the iron sulfate remaining in the mother liquor, removing the ammonium alum, dissolving the ammonium alum in water and treating the solution with ammonia, thus producing aluminum hydroxid and ammonium sulfate, removing and drying the aluminum hydroxid, treating the aforesaid mother liquor with ammonia, thereby producing iron hydroxid and ammonium sulfate, removing the iron hydroxid and recovering the ammonium sulfate.

4. The herein described process for the treatment of alunogen, halotrichite and natural alum, consisting in producing a solution of the soluble constituents thereof, treating said solution with a solution of ammonium sulfate thereby producing a double sulfate of aluminum and ammonium (ammonium alum), the iron sulfate remaining in the mother liquor, removing the ammonium alum, dissolving the ammonium alum in water and treating the solution with ammonia, thus producing aluminum hydroxid and ammonium sulfate, removing, drying and calcining the aluminum hydroxid, treating the aforesaid mother liquor with ammonia, thereby producing iron hydroxid and ammonium sulfate, removing the iron hydroxid and recovering the ammonium sulfate.

5. The herein described process for the treatment of alunogen, halotrichite and natural alum, consisting in producing a solution of the soluble constituents thereof, treating said solution with a solution of ammonium sulfate thereby producing a double sulfate of aluminum and ammonium (ammonium alum) the iron sulfate remaining in the mother liquor, removing the ammonium alum, dissolving the ammonium alum in water and treating the solution with ammonia thus producing aluminum hydroxid and ammonium sulfate, removing and drying the aluminum hydroxid, treating the aforesaid mother liquor with ammonia, thereby producing iron hydroxid and ammonium sulfate, removing, drying and calcining the iron hydroxid and recovering the ammonium sulfate.

6. The herein described process for the treatment of alunogen, halotrichite and natural alum, consisting in producing a solution of the soluble constituents thereof, treating said solution with a solution of ammonium sulfate thereby producing a double sulfate of aluminum and ammonium (ammonium alum), the iron sulfate remaining in the mother liquor, removing the ammonium alum, dissolving the ammonium alum in water and treating the solution with ammonia, thus producing aluminum hydroxid and ammonium sulfate, removing, drying and calcining the aluminum hydroxid, treating the aforesaid mother liquor with ammonia, thereby producing iron hydroxid and ammonium sulfate, removing, drying and calcining the iron hydroxid and recovering the ammonium sulfate.

In testimony whereof we affix our signatures.

MAURICE BARNETT.
LOUIS BURGESS.